Dec. 23, 1930.  T. B. SIMS  1,786,032
SEWAGE DISPOSAL PLANT PUMP
Filed Aug. 13, 1928   2 Sheets-Sheet 1

INVENTOR
Thomas B. Sims
BY
Jack A. Schley
ATTORNEY

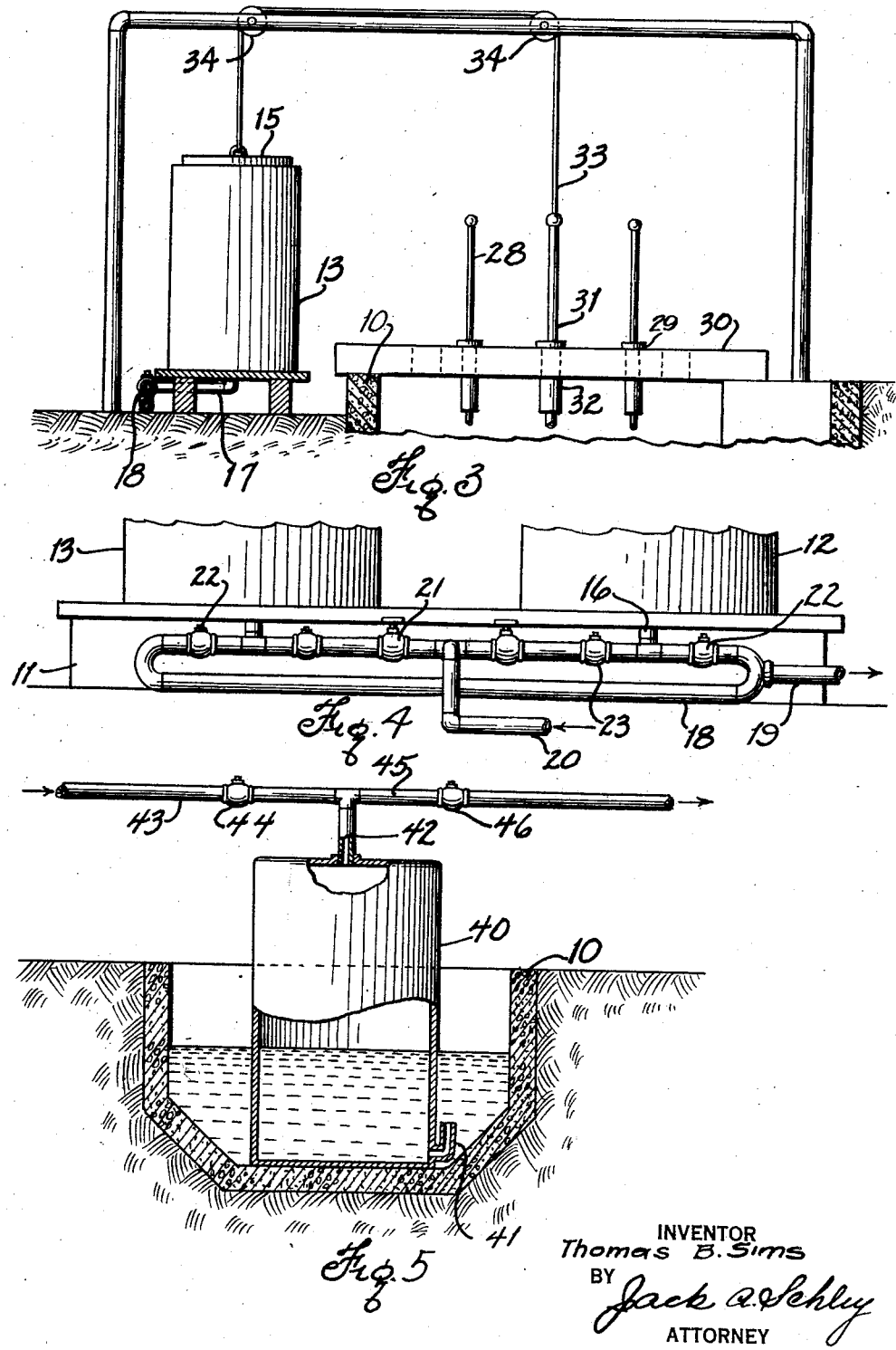

Patented Dec. 23, 1930

1,786,032

UNITED STATES PATENT OFFICE

THOMAS B. SIMS, OF CLEBURNE, TEXAS, ASSIGNOR TO L. J. WARDLAW, OF TARRANT COUNTY, TEXAS

SEWAGE-DISPOSAL-PLANT PUMP

Application filed August 13, 1928. Serial No. 299,276.

This invention relates to new and useful improvements in sewage disposal plant pumps.

One object of the invention is to provide automatic means for extracting gaseous fluids from the sludge tank.

A particular object of the invention is to utilize the rise and fall of the liquid in the dosing tank to operate means for creating a suction to draw off the gases from the sludge tank and for placing said gases under pressure and expelling them for conduction to the point of use.

A further object of the invention is to provide alternately operating units, whereby one acts to draw in the gas while the other expels it, when operated by the rise and fall of the liquid.

A construction designed to carry out the invention will be hereinafter described, together with other features of the invention.

The invention will be more readily understood from a reading of the following specification and by reference to the accompanying drawings, in which an example of the invention is shown, and wherein:

Fig. 3 is a partial vertical sectional view taken on the line 3—3 of Fig. 1, Fig. 4 is a detail of the pipe and valve connections, and Fig. 5 is a vertical sectional view of a modified form.

Figure 1:
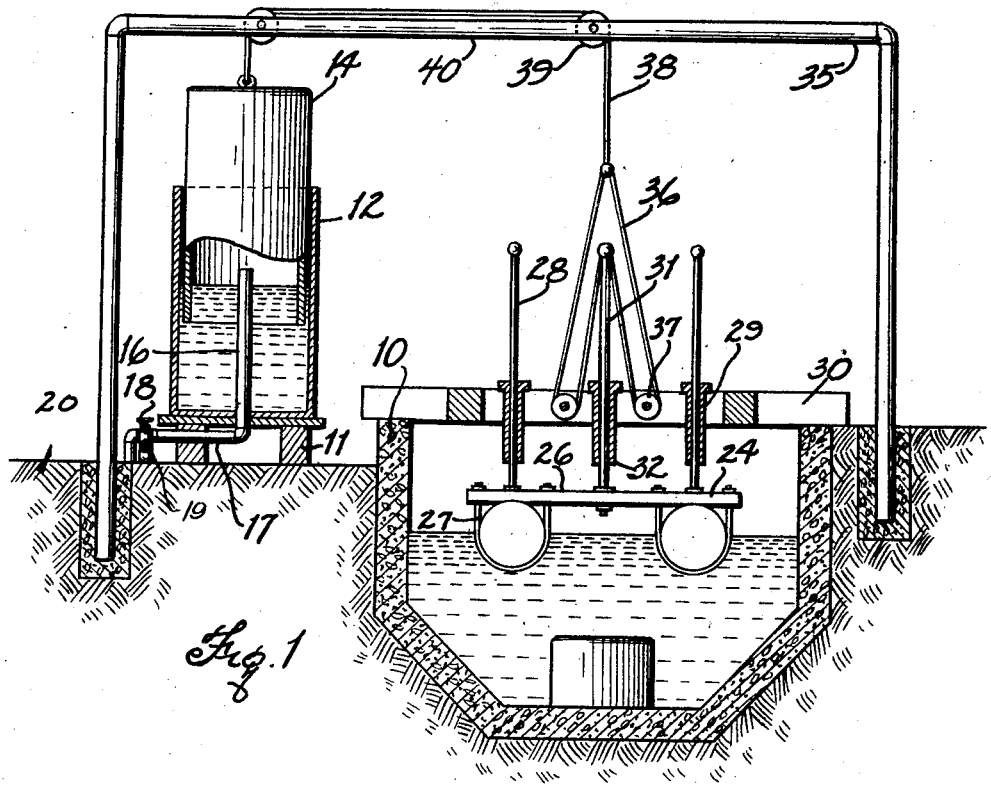
Fig. 1 is a vertical sectional view taken on the line 1—1 of Fig. 2.
Figure 2:
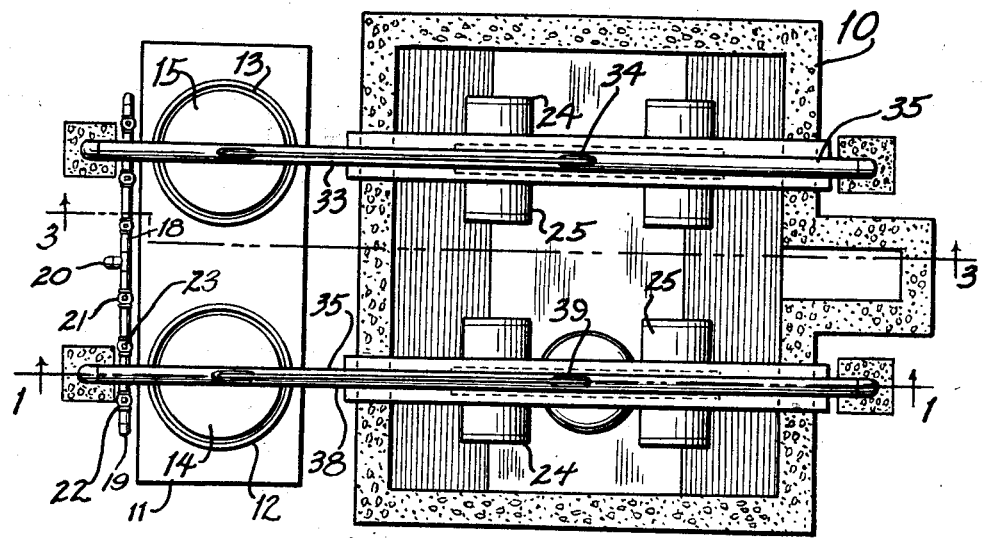
Fig. 2 is a plan view of an apparatus constructed in accordance with the invention.

This application is filed as a continuation in part of my former application Serial No. 272,342, filed April 23, 1928.

In the drawings the numeral 10 designates a dosing chamber which forms part of the ordinary sewage disposal plant and a description of said tank is deemed unnecessary. Water or liquid is supplied to this tank and discharged therefrom, therefore the liquid level in said tank is constantly rising and falling.

On a platform 11 at the side of the tank I mount a pair of cylindrical containers 12 and 13, respectively. In the container 12 I dispose an inverted cylindrical container or dome 14, while in the container 13 is disposed a dome 15. Each container is filled to a certain point with water and the lower end of the dome is at all times immersed in said water.

In each container is disposed a vertical gas conducting pipe 16 having its upper end within the dome above the water level. Each pipe extends through the bottom of its container and is connected with a lateral 17 under the platform. The laterals are connected in a manifold 18 having a discharge pipe 19 at one end and a suction pipe 20 connected to the center of its top member.

On each side of the suction pipe 20 a cut-off valve 21 is included in the manifold. On one side of each lateral 17 a check valve 22 is connected in the manifold and on the opposite side of each lateral a second check valve 23 is connected in the manifold.

The check valves 22 are arranged to open under pressure and close under a suction, while the check valves 23 are arranged to close under a pressure and open under a suction. From this it will be seen that when gas is being drawn into a container the check valve 22 will be closed and the check valve 23 will be opened, and conversely when gas is being expelled the check valve 23 will be closed and the check valve 22 opened.

When either of the domes 14 or 15 is lowered in its container the gas entrapped therein will be compressed and forced out through the pipe 16 and when said dome is elevated a suction will be created whereby gas will be drawn in through the pipe 16. It is desirable to alternately operate the domes 14 and 15 so that one will rise when the other falls. By this arrangement gas will be continually pumped.

For each dome a float unit 24 is provided. Each float unit comprises float drums 25 secured to a beam 26 by brackets 27. Each beam has guide rods 28 extending vertically through guide sleeves 29 carried by a cross bar 30 mounted on top of the tank 10. A central post 31 is carried by each beam and extends vertically through a guide sleeve 32 mounted in the cross bar 30.

In Fig. 3 a cable 33 extends from the top of the post over pulleys 34 to a point of connection with the dome 15, said pulleys being supported in an overhead frame 35. When the float is lowered the cable 33 will be pulled, whereby the dome 14 will be elevated and when the float rises the dome will be lowered. In order to obtain the opposite movement for the dome 14 a cable loop 36 is connected to the upper end of the other post 31 and engaged around pulleys 37 journaled in the supporting bar 30. The cable loop is connected to the end of a cable 38 passing over pulleys 39 journaled in a frame 40 and attached to the dome 14. When the float moves upwardly and elevates the post 31 the cable loop 36 attached thereto is manipulated so as to pull the cable 31 downwardly, thus lowering the dome 14 whereas the dome 15 is being elevated; and conversely the dome 14 will be elevated when the dome 15 is lowered.

This device connected to the gas chamber of the disposal plant will act as a pump to draw in the gas through the pipe 20 and expel it through the pipe 19. By regulating the check valves 22, or by any other means, the expelled gas may be placed under pressure. This makes a very simple and inexpensive mechanism for removing the gas from the sludge tank and delivering it under pressure to the point desired.

In Fig. 5 I have shown a simplified structure which could be used successfully. This form includes a cylindrical closed tank 40 having a water inlet pipe 41 at its lower end and constantly immersed in the water of the tank 10. A central discharge pipe 42 leads from the top of the tank, which is otherwise imperforate. Water will enter the tank through the pipe 41 as it rises and falls in the tank 10. The pipe 42 is connected with a suction pipe 43 including a check valve 44 and is also connected with a discharge pipe 45 including a check valve 46. When the water is lowered in the vat 10, it will also be lowered in the tank 40 and as it falls in the tank 40 will set up a suction whereby the valve 46 will be closed and gas will be drawn in through the pipe 43 and valve 44. When the water rises in the tank 10 it will enter the tank 40, thus forcing out the gas through the pipe 42 to the pipe 45 and past the valve 46, the valve 44 being closed.

Various changes in the size and shape of the different parts, as well as modifications and alterations, may be made within the scope of the appended claims.

What I claim, is:

1. In a pump, a pair of containers each holding water, domes telescoping into the containers and having their lower ends immersed in the water, gas pipes in each container extending above the water therein, a pair of floats operating in unison, means connecting one float to raise one of the domes in a descending movement of the float, means connecting the other float to raise the other dome in an ascending movement of the float, whereby one dome is raised and the other dome is lowered when the floats are raised together and lowered together, gas suction pipes including check valves connected with the gas pipes, and gas discharge pipes connected with the gas pipes and including check valves.

2. In a pump, a pair of containers each holding water, domes telescoping into the containers and having their lower ends immersed in the water, gas pipes in each container extending above the water therein, a pair of floats, means connecting one float with one of the domes, a dosing tank, a pair of floats disposed in the dosing tank, a cable connecting one of the floats with one of the domes, a cable loop connected with the other float, a pulley guiding the loop, a cable connected with the loop and the other dome, whereby said domes are oppositely operated.

3. In a pump, a pair of containers, domes telescoping into the containers, a gas pipe extending upward into each container, a gas conductor having check valves and connected to the gas pipes to feed in alternation from the containers, float members, means connecting one member with one dome, and means connecting the other float with the other dome constructed to positively raise the domes in alternation by a movement of the float members in opposite directions.

In testimony whereof I affix my signature.

THOMAS B. SIMS.